Inventor
WILLIE C. SHINLIVER
By Clarence A. O'Brien
Attorney

July 15, 1941.  W. C. SHINLIVER  2,249,568
DEMOUNTABLE RIM
Filed March 9, 1940  2 Sheets-Sheet 2

Inventor
WILLIE C. SHINLIVER,
By Clarence A. O'Brien
Attorney

Patented July 15, 1941

2,249,568

UNITED STATES PATENT OFFICE 2,249,568

DEMOUNTABLE RIM

Willie C. Shinliver, Blue Diamond, Ky.

Application March 9, 1940, Serial No. 323,185

1 Claim. (Cl. 152—405)

The present invention relates to demountable rims for vehicle wheels and has for its primary object to provide a rim structure embodying an entire supporting surface for a pneumatic tire and in which the tire is adapted to be removed from the wheel together with the rim.

A further object is to provide a novel attaching construction for the rim whereby the rim is positively secured in position on the wheel without danger of the rim becoming accidentally displaced thereon.

A still further object is to provide a demountable rim of this character adapted for use upon disk and other types of wheels and also including a cover plate for the outer surface of the wheel which provides a shield for the attaching bolt for the rim.

A still further object is to provide a wheel construction of this character of simple and practical form, which is strong and durable, which may be easily and quickly removed for demounting the tire and otherwise well adapted for the purposes for which the same is intended.

Other objects and advantages reside in the details of construction and operation as more fully hereinafter desscribed and claimed, reference being had to the accompanying drawings forming part hereof, wherein like numerals refer to like parts throughout, and in which—

Figure 1:
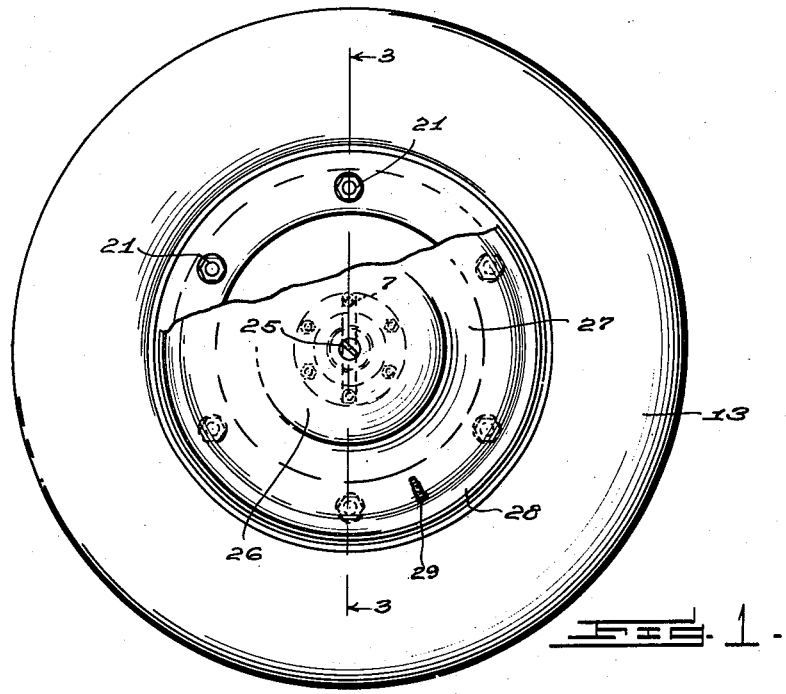
Figure 2:
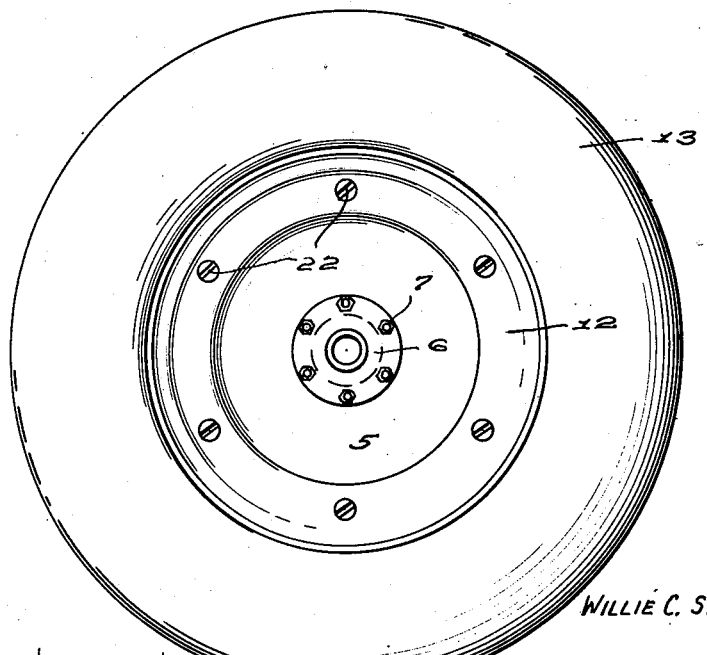
Figures 3, 4:
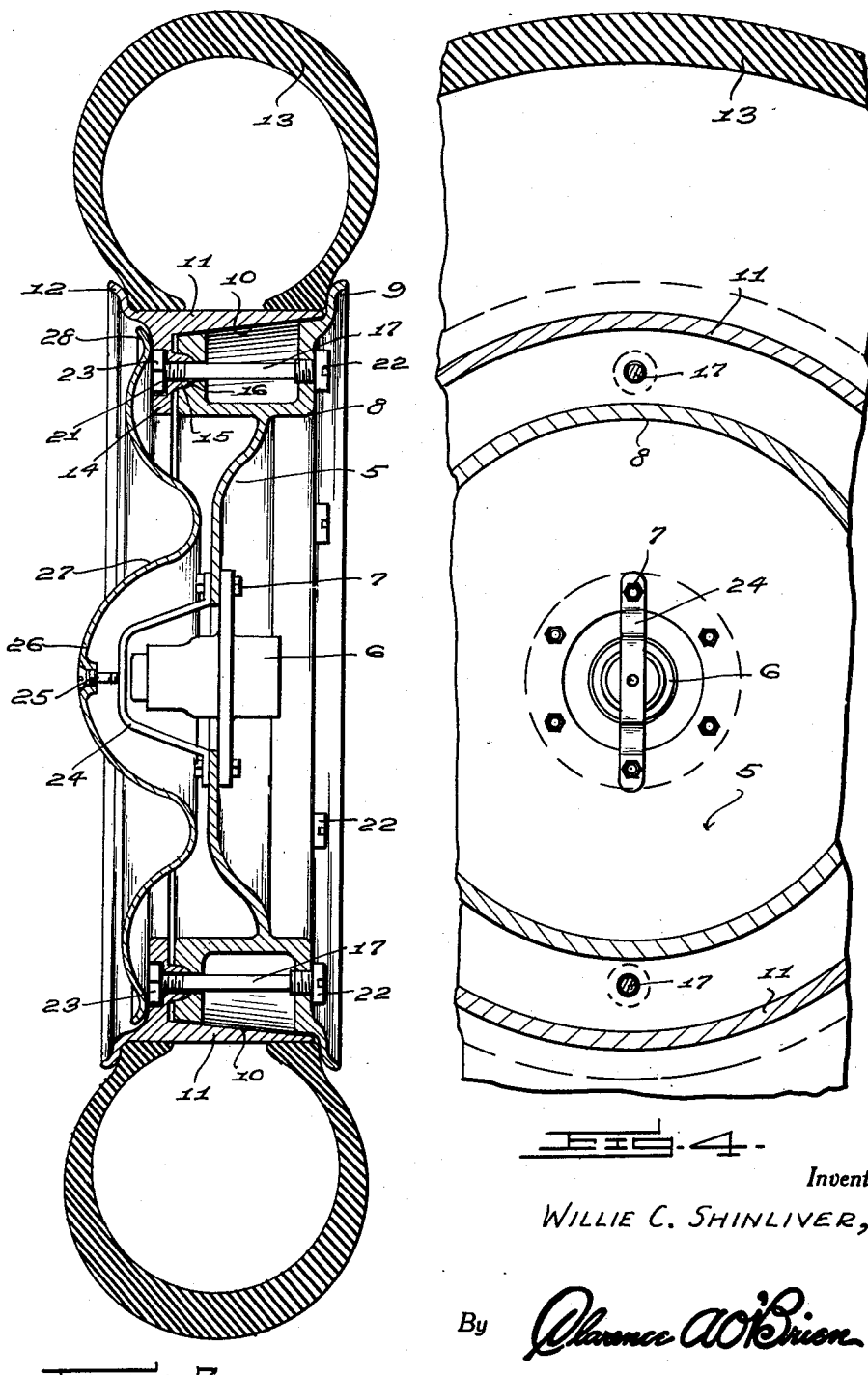

Figure 1 is an outside elevational view of the wheel with the tire mounted thereon and with parts broken away, Figure 2 is a similar view of the inner side of the wheel, Figure 3 is a vertical sectional view taken substantially on a line 3—3 of Figure 1, and Figure 4 is a fragmentary side elevational view with parts broken away and shown in section.

Referring now to the drawings in detail, wherein for the purpose of illustration I have disclosed a preferred embodiment of the invention, the numeral 5 designates the vehicle wheel of disk form mounted on the axle 6 by means of bolts 7. The wheel includes the felly construction 8 which is of channel form, the inner edge of which is formed with the outwardly extending tire-engaging flange 9. The outer peripheral edges of the felly are inclined downwardly toward the outside of the wheel as shown at 10 and seated on the inclined surface of the outer periphery of the felly is the rim designated generally at 11. The inner edge of the rim 11 is adapted to abut the flange 9 and the outer edge of the rim is formed with the outwardly extending flange 12, the tire 13 being seated on the outer periphery of the rim between the flanges 9 and 12 as more clearly shown in Figure 3 of the drawings.

An inwardly projecting flange 14 is formed on the inner periphery of the rim 11, adjacent its outer edge and is positioned flatwise against the outer surface of the felly 8. The outer surface of the felly is provided with spaced recesses 15 within which substantially conical lugs 16 are conformably seated. Rim attaching bolts 17 are inserted transversely through the felly and through the lugs or bosses 16, the inner ends of the bolts being provided with left-hand threads 20 for threaded engagement in the inner wall of the felly while the outer end of the bolt is formed with oppositely formed threads 21 which are threaded in the boss or lug 16. The inner end of the bolts may be provided with screw heads 22 while nuts 23 are threaded on the outer ends of the bolts and countersunk in the outer surface of the flange 14.

A substantially U-shaped bracket 24 projects outwardly from the hub 6 with the ends of the bracket anchored in position by the bolts 7, the bight portion of the bracket providing anchoring means for a screw 25 which is threaded through the concavo-convex central portion 26 of a shield 27 which covers the outer surface of the wheel, the outer periphery of the shield 18 bearing against the flange 14 at a point radially outwardly from the nuts 23 of the bolts 17.

The tire valve 29 extends through the shield 27 to permit inflation of the line without removing the shield.

It is believed the details of construction and manner of use of the device will be readily understood from the foregoing without further detailed explanation.

Having thus described the invention, what I claim is:

A vehicle wheel including a felly having a bottom and sides at right angles to said bottom whereby said felly is transversely U-shaped, and an outwardly extending tire retaining flange on one side, a rim portion positioned on the felly radially outwardly thereof and having one edge adapted to abut the tire retaining flange of the felly, said rim portion supporting a tire entirely thereon, a tire retaining flange on the other edge of the rim portion and cooperating with the first named flange to retain the tire on the rim portion, said rim portion having an inwardly extending flange adapted for bearing against one side of the felly, conical recesses in the said one side of the felly, conical protuberances on the abutting side of the last named flange adapted to conformably seat in said recesses said recesses and protuberances having bores therein and bolts removably received in said bores for securing said last named flange to the felly, said protuberances serving to aline the bores.

WILLIE C. SHINLIVER.